United States Patent Office 3,500,965
Patented Mar. 17, 1970

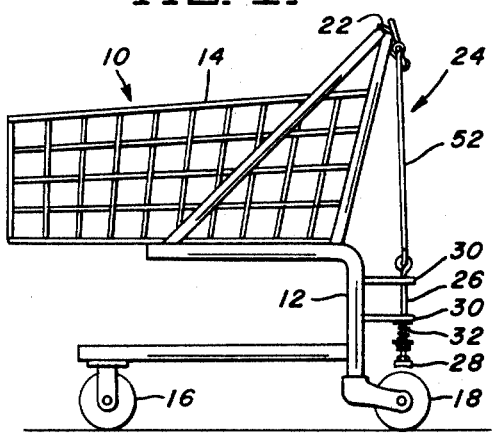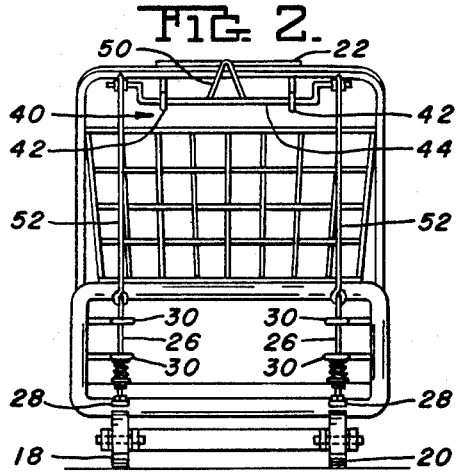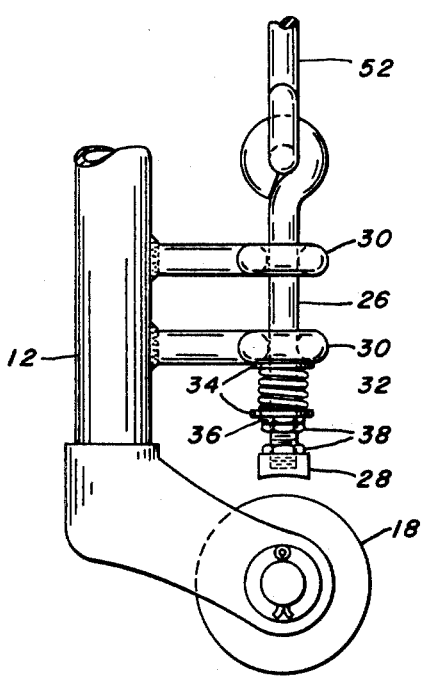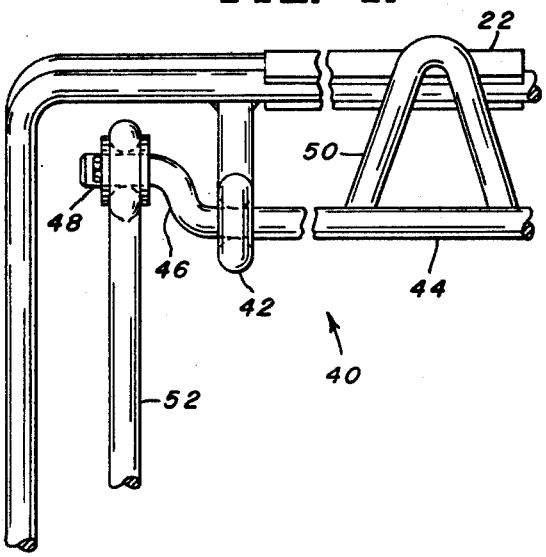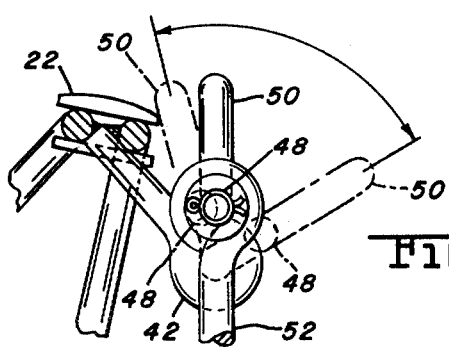
INVENTORS.
ARTHUR L. NOSSOKOFF &
MAX ANTIN

3,500,965
ANTIROLL DEVICE FOR SHOPPING CARTS AND THE LIKE
Arthur L. Nossokoff, 957 Flemington St., and Max Antin, 950 Flemington St., both of Pittsburgh, Pa. 15217
Filed Jan. 31, 1969, Ser. No. 795,426
Int. Cl. B60t 1/04, 13/04
U.S. Cl. 188—29                                    7 Claims

ABSTRACT OF THE DISCLOSURE

An antiroll device for the shopping carts and the like is disclosed. The antiroll device comprises at least one rod having a friction means on its lower end which is selectively movable toward, against and away from a wheel of the cart. A biasing means associated with the rod urges the rod toward said one wheel, and a rod operating means, which is selectively movable between first and second positions, supported on the frame and operatively conected to the rod, controls operation of the rod. The rod operating means when in the first position restrains movement of the rod in opposition to the biasing means, and when the rod operating means is moved to the second position, such movement moves the rod in concert with the biasing means whereby the friction means is moved into engagement with the one wheel, thereby restraining rotation of the wheel.

Background of the invention

This invention relates to shopping carts and the like, and more particularly, to an antiroll device for such vehicles. The present invention provides apparatus designed for shopping carts and the like which enables the operator of the cart to quickly lock and unlock the rear wheels of the cart while loading or unloading such carts. It may be explained that loading or unloading a shopping cart on an inclined parking lot road surface or any other inclined surface, presents a serious problem due to the fact that in most cases the wheels of such carts are free turning and not provided with locking means. Under such conditions, carts at times roll away from the operator of the cart under the influence of gravity of a sudden gust of wind, running down the inclined surface, and at times, such loose carts damage automobiles or cause injury to people.

Summary of the invention

Briefly, the present invention provides an antiroll device for a vehicle having a frame and a plurality of free turning wheels supporting the frame. In accordance with the invention, at least one rod is mounted on the frame of the vehicle for reciprocal movement relative thereto. A friction means is associated with the rod and movable thereby. Biasing means, preferably a coil spring, is associated with the rod for urging the rod toward one of the wheels of the vehicle. Finally, a rod operating means that is selectively movable between first and second positions is supported on the frame and operatively connected to the rod. The rod operating means when in the first position restrains movement of the rod in opposition to the spring, and when it is moved to the second position, such movement moves the rod in concert with the spring whereby the friction means is moved by the rod into engagement with the wheel, thereby restraining rotation of the wheel.

Brief description of the drawings

FIGURE 1 is a view in side elevation of a shopping cart provided with an antiroll device in accordance with the invention;

FIG. 2 is a rear view of the shopping cart shown in FIG. 1;

FIG. 3 is an enlarged view of the left rear wheel of the cart shown in FIG. 1 together with adjacent parts of the antiroll device of the present invention;

FIG. 4 is an enlarged view of the upper left rear portion of the cart shown in FIG. 2 illustrating in greater detail parts of the antiroll device of the present invention; and FIG. 5 is a side view partly in section and partly in elevation illustrating various positions of the hand-operated actuating lever according to the present invention.

Description of the preferred embodiments

Referring now to the drawings, there is shown in FIGS. 1 and 2, an operator propelled vehicle or shopping cart 10 having a frame 12, a basket 14 fixed to the frame, a pair of front wheels 16 and a pair of rear wheels 18 and 20 in coaxial relationship and a handlebar 22 for steering the cart. The front and rear wheels are free turning and support the frame and basket thereon.

At the rear end of the cart there is provided an antiroll device therefor which is shown generally at 24. A pair of vertically oriented rods 26 is mounted on the frame 12 for vertical reciprocal movement relative thereto. Each of the rods 26 is provided with threads on its lower end and each has a friction means 28 threaded onto its lower end that is constructed of any suitable friction material such as rubber. The rods 26 are mounted within a pair of guide means 30 which are vertically spaced from one another and disposed in vertically spaced positions above the rear wheels of the cart. Each of the guide means 30 is preferably an eyebolt rigidly connected to the frame 12. A biasing means or coil spring 32 is associated with each rod 26. A pair of spring washers 34 is provided on either side of each spring 32 and an adjusting nut 36 is threaded on each rod 26 for putting the springs 32 under compression. A pair of lock nuts 38 is also threaded on each rod for locking the adjusting nut 36 and friction means 28 in place. The springs 32, being under compression, react against the lower guides 30 and urge the rods 26 and thus the friction means 28 downwardly toward the rear wheels of the cart.

A rod operating means for vertically moving the rods 26 up and down relative to the frame is shown generally at 40. The rod operating means 40 is supported on the frame 12 at the location of the handlebar 22 by means of a pair of eyebolts 42 rigidly secured as by welding to the frame 12.

The rod operating means includes a shaft 44 rotatably supported on the frame by the eyebolts 42 adjacent to and in spaced relationship to the handlebar 22. A crank arm 46 and a crankpin 48 are formed on each end of the shaft 44 and an actuating lever 50 is non-rotatably secured on the shaft 44 intermediate its ends for imparting rotational movement to the shaft 44. The axis of the shaft 44 is parallel to and vertically spaced from the axis of the rear wheels.

The rod operating means 40 further includes a pair of connecting links 52. Each of the connecting links 52 has a first or lower end operatively connected to the upper end of rod 26 and a second or upper end operatively connected to one of the crankpins 48.

Operation of the antiroll device can best be understood by reference to FIG. 5. The rod operating means 40 is selectively movable between a first position wherein the lever 50 is in abutment with the handlebar 22 and a second position wherein the lever 50 is displaced away from the handlebar 22 as indicated by the arrow shown in FIG. 5. The solid line position of the lever 50 in FIG. 5 can be considered to be a neutral position. As was stated above, the springs 32 urge the rods 26 downwardly toward the rear wheels, however, due to the rods being interconnected with the crankpins 48 through connecting links 52, when the lever 50 is in the first position in abutment with the handlebar 22, downward movement of the rods 26 is restrained in opposition to the spring force because shaft 22 cannot rotate. As a result, the friction means 28 are prevented from moving into contact with the rear wheels. This is the condition shown in FIG. 1. When the lever is moved away from the handlebar 22, this imparts rotational movement to the shaft 44. The rotational movement of the shaft 44 is converted to vertical movement in the connecting links 52 and rods 26 by reason of the crank arms and crankpins provided on the shaft 44. Thus, as the lever is moved through the neutral position, the rods 26 due to their interconnection with the shaft 44 are moved downward in concert with the spring force such that the friction means 28 are moved into engagement with the rear wheels, thereby restraining rotation thereof. The friction means 28 will remain in contact with the wheels under the influence of the downward force applied thereto by the springs through the rods 26 until the lever is returned to its first position.

Further, it will be apparent that the embodiment shown is only exemplary and that various modifications can be made in construction and arrangement within the scope of the invention as defined in the appended claims.

We claim as our invention:

1. An antiroll device for a vehicle having a frame and a plurality of free turning wheels supporting said frame comprising,
   (a) a rod mounted on said frame for reciprocal movement relative thereto,
   (b) friction means associated with said rod and movable thereby,
   (c) rod operating means selectively movable between first and second positions supported on the frame and operatively connected to said rod for moving said rod relative to said frame, and
   said rod operating means comprising a shaft rotatably supported on said frame and having a crank arm and a crankpin formed on one end thereof, a connecting link having a first end operatively connected to one end of said rod and a second end operatively connected to said crankpin, and an actuating lever non-rotatably secured on said shaft for imparting rotational movement thereto, and
   (d) biasing means associated with said rod and reacting against said rod to simultaneously urge said rod toward one of said wheels and maintain said rod operating means in said first position when said rod operating means is in said first position, and when said rod operating means is moved to said second position, to maintain said rod operating means in said second position, said rod operating means when in said first position restraining movement of said rod in opposition to said biasing means, and when moved to said second position, moving said rod in concert with said biasing means such that said friction means is moved by said rod into engagement with said one wheel thereby restraining rotation of said one wheel.

2. An antiroll device as defined in claim 1 wherein said vehicle includes a handlebar for steering said vehicle, said plurality of free turning wheels includes a pair of rear wheels in spaced coaxial relationship, said shaft is rotatably supported on said vehicle adjacent to and in spaced relationship to said handlebar with the axis of said shaft being parallel to and vertically spaced from the axis of said rear wheels, and said actuating lever is selectively movable between a first position in abutment with said handlebar and a second position away from said handlebar.

3. An antiroll device for a shopping cart having a frame, a basket fixed to the frame, a pair of front wheels, a pair of rear wheels in coaxial relationship and a handlebar for steering said cart comprising,
   (a) a shaft rotatably supported on said cart, the axis of said shaft being parallel to and vertically spaced from the axis of said rear wheels, said shaft having a crank arm and a crankpin formed on at least one of its ends,
   (b) an actuating lever non-rotatably secured on said shaft for imparting rotational movement thereto, said lever selectively movable between first and second positions,
   (c) at least one vertically oriented rod mounted on said frame for vertical reciprocal movement relative thereto, said rod having friction means on its lower end,
   (d) at least one connecting link, said connecting link having a first end operatively connected to the upper end of said rod and a second end operatively connected to said crankpin, and
   (e) biasing means associated with said rod, said biasing means reacting against a frame portion and said rod to simultaneously urge said rod toward one of said pair of rear wheels and maintain said actuating lever in said first position when said lever is in said first position, and when said lever is in said second position, to maintain said lever in said second position, the arrangement being such that when said actuating lever is in said first position, movement of said rod is restrained in opposition to said biasing means, and when said lever is moved to said second position, such movement moves said rod in concert with said biasing means whereby said friction means is moved into engagement with said one rear wheel thereby restraining rotation thereof.

4. An antiroll device for a shopping cart as defined in claim 3 including at least one guide means rigidly connected to said frame, said guide means disposed in a vertically spaced position above said one rear wheel, said rod mounted within said guidemeans, said biasing means reacting against said guide means and said rod.

5. An antiroll device for a shopping cart as defined in claim 3 wherein said shaft is rotatably supported on said cart adjacent to and in spaced relationship to said handlebar, and said actuating lever is selectively movable between a first position in abutment with said handlebar and a second position away from said handlebar.

6. An antiroll device for a shopping cart as defined in claim 3 wherein said biasing means comprises a coil spring, means associated with said rod for putting said spring under compression, said last-named means being adjustable for varying the compression of said spring.

7. An antiroll device for a shopping cart having a frame, a basket fixed to the frame, a pair of front wheels, a pair of rear wheels in coaxial relationship and a handlebar for steering said cart comprising,
   (a) a shaft rotatably supported on said cart adjacent to and in spaced relationship to said handlebar, the axis of said shaft being parallel to and vertically spaced from the axis of said rear wheels, said shaft having a crank arm and a crankpin formed on each of its ends,
   (b) a hand-operated actuating lever non-rotatably secured on said shaft for imparting rotational movement thereto, said lever selectively movable between a first position in abutment with said handlebar and a second position away from said handlebar,
   (c) a pair of vertically oriented rods mounted on said frame for vertical reciprocal movement relative thereto, each of said rods having friction means on its lower end,
   (d) a pair of connecting links, each of said connecting links having a first end operatively connected to the upper end of one of said rods and a second end operatively connected to one of said crankpins, (e) a pair of biasing means associated with each of said rods, each one of said biasing means reacting against one of said rods to simultaneously urge it and thus the friction means thereon downwardly toward a wheel of said pair of rear wheels and maintain said actuating lever in said first position when said lever is in said first position, and when said lever is in said second position, to maintain said lever in said second position, the arrangement being such that when said hand-operated lever is in said first position, downward movement of said rods is restrained in opposition to said biasing means, and when said lever is moved to said second position, such movement moves said rods in concert with said biasing means whereby said friction means are moved downwardly into engagement with said rear wheels thereby restraining rotation of said rear wheels.

References Cited
UNITED STATES PATENTS

| | | | |
|---|---|---|---|
| 2,638,183 | 5/1953 | Prowinsky | 188—29 |
| 3,061,049 | 10/1962 | Bramley | 280—33.99 |
| 3,095,211 | 6/1963 | Altherr | 280—33.99 |

LEO FRIAGLIA, Primary Examiner

R. R. SONG, Assistant Examiner

U.S. Cl. X.R.

188—166; 280—33.99